United States Patent [19]

Albrecht

[11] Patent Number: 5,126,772
[45] Date of Patent: Jun. 30, 1992

[54] PRESSURE-COMPENSATION SHUTTER RELEASE DEVICE FOR UNDERWATER CAMERA

[75] Inventor: Richard E. Albrecht, Honeoye Falls, N.Y.

[73] Assignee: Eastman Kodak Company, Rochester, N.Y.

[21] Appl. No.: 696,403

[22] Filed: May 6, 1991

[51] Int. Cl.⁵ ..................... G03B 17/08; G03B 17/38
[52] U.S. Cl. ...................................... 354/64; 354/266
[58] Field of Search ................................ 354/64, 266

[56] References Cited

U.S. PATENT DOCUMENTS 4,882,600 11/1989 Van de Moere ..................... 354/64

Primary Examiner—Michael L. Gellner
Attorney, Agent, or Firm—Roger A. Fields

[57] ABSTRACT

A water-resistant housing that contains a camera has a seesaw portion which, when manually depressed at a region opposite a shutter release button of the camera, is pivoted towards the camera to depress the button and simultaneously at a region remote from the button is pivoted away from the camera. As a result, when the housing with the camera is placed under water, the water pressure balances the two regions instead of depressing the region opposite the button to possibly depress the button.

8 Claims, 4 Drawing Sheets

PRESSURE-COMPENSATION SHUTTER RELEASE DEVICE FOR UNDERWATER CAMERA

BACKGROUND OF THE INVENTION

1. Field of the Invention

The invention relates generally to the field of photography, and in particular to underwater cameras and to water-resistant housings for such cameras.

2. Description of the Prior Art

Typically, an inexpensive underwater camera comprises a standard camera enclosed in some form of a water-resistant housing, with the manual controls operable through water-tight seals such "0" rings or via flexible gaskets or membranes. For example, a flexible membrane may be located on the water-resistant housing which can be manually depressed to in turn depress a shutter release button of the camera. The problem, however, is that the membrane may not be stiff enough to resist being flexed by the water pressure. Thus, the shutter release button may be accidentally depressed. Conversely, increasing the stiffness of the membrane may make it difficult to manually depress the membrane, particularly when the housing is above water.

SUMMARY OF THE INVENTION

A water-resistant housing that contains a camera has a seesaw portion which, when manually depressed at a region opposite a shutter release button of the camera, is moved towards the camera to depress the button and simultaneously at a region remote from the button is moved away from the camera. As a result, when the housing with the camera is placed under water, the pressure balances the two regions instead of possibly depressing the region opposite the button to accidentally depress the button.

DETAILED DESCRIPTION OF THE PREFERRED EMBODIMENT

Figure 1:
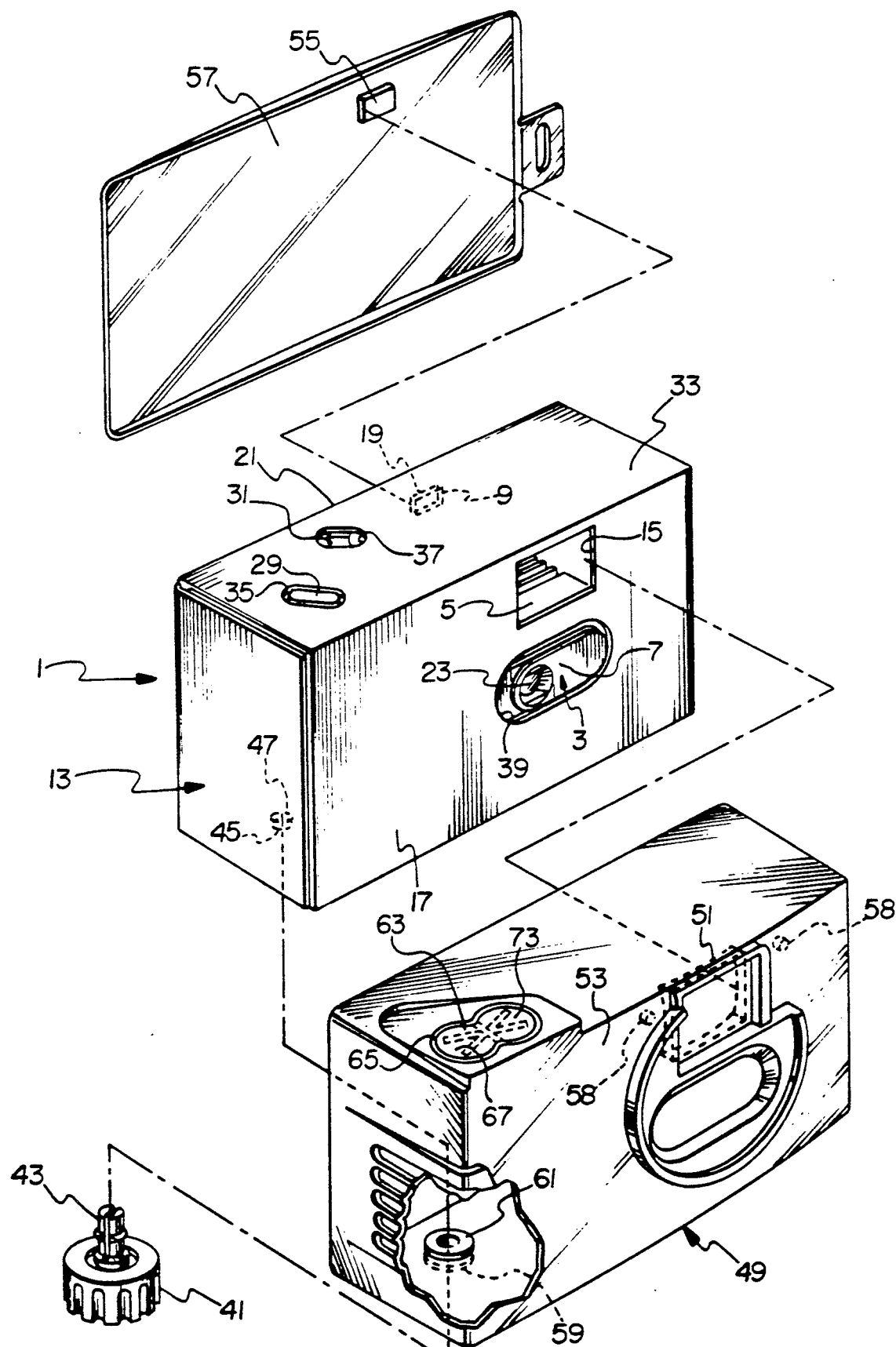
FIG. 1 is a front exploded perspective view of an underwater 35mm camera according to a preferred embodiment of the invention, showing the camera and a water-resistant housing.

The invention is disclosed in connection with an underwater 35mm camera. Because such a camera is widely known, this description is directed in particular to photographic elements forming part of or cooperating directly with the invention. It is to be understood, however, that other elements not specifically shown or described may take various forms known to person of ordinary skill in the art.

Referring now to the drawings, FIGS. 1–4 depict an underwater 35mm camera 1. The underwater camera 1 is a point-and-shoot type and comprises (a) an inner camera shell 3 having a front viewfinder opening 5 arranged in a front wall 7 of the inner shell and a rear viewfinder opening 9 arranged in a rear wall 11 of the inner shell for viewing a subject to be photographed through the two viewfinder openings and (b) an outer sealed pack 13 which tightly contains the inner shell and has a front opening 15 arranged in a front wall 17 of the outer pack and a rear opening 19 arranged in a rear wall 21 of the outer pack to be substantially aligned with the respective viewfinder openings in the inner shell. The inner camera shell 3 houses a taking lens 23, a single blade shutter (not shown), a film advance and metering mechanism (not shown), and a frame counter (not shown). A top wall 25 of the inner camera shell 3 has a top opening 27 for a manually depressible shutter release button 29 and a top window 31 for the frame counter. A top wall 33 of the outer sealed pack 13 has respective top openings 35 and 37 for the release button 29 and the top window 31 for the frame counter. The front wall 17 of the outer sealed pack 13 has a front opening 39 for the taking lens 23. A manually rotatable thumbwheel 41 is coupled to the film advance and metering mechanism via a stem 43 which extends through respective bottom openings 45 and 47 in the outer sealed pack 13 and the inner camera shell 3.

Figure 3:
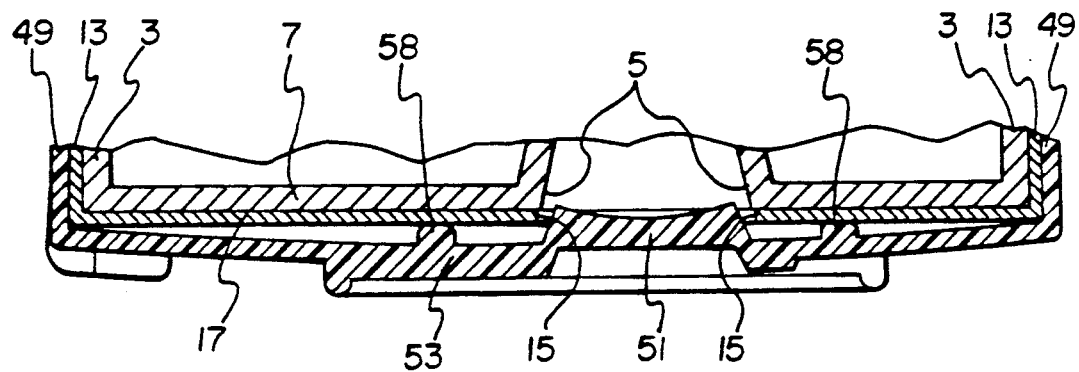
FIG. 3 is a sectional view of the respective front walls of the water-resistant housing, the outer sealed pack, and the inner camera shell, particularly with respect to a tunnel-like viewfinder.
Figure 4:
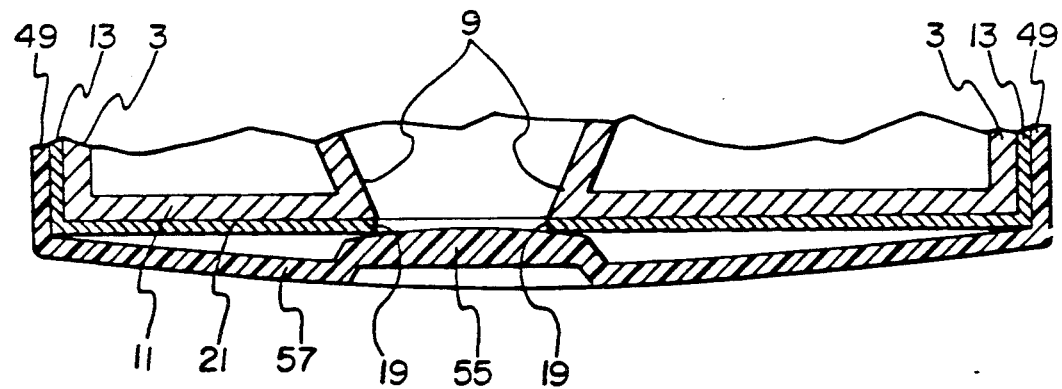
FIG. 4 is a sectional view similar to FIG. 3, but at the respective rear walls of the water-resistant housing, the outer sealed pack, and the inner camera shell.

A plastic transparent water-resistant housing 49 tightly encloses the outer sealed pack 13 and the inner camera shell 3. See FIG. 1. The water-resistant housing 49 includes a front plastic viewfinder lens 51 integrally formed on a front wall 53 of the casing to be optically aligned with the front opening 15 in the outer pack 13 and the front viewfinder opening 5 in the inner shell 3 as shown in FIG. 3, and it includes a rear plastic viewfinder lens 55 integrally formed on a rear wall 57 of casing to be optically aligned with the rear opening 19 in the outer pack and the rear viewfinder opening 9 in the inner shell as shown in FIG. 4. The front viewfinder lens element 51 extends through the front opening 15 in the outer pack 13 and slightly into the front viewfinder opening 5 in the inner shell 3. See FIG. 3. A pair of spacers 58 are integrally formed on the front wall 53 of the water-resistant housing 49 to abut the front wall 17 of the outer pack 13, to limit the extent to which the front viewfinder lens element 51 extends into the front viewfinder opening 5 of the inner shell 3. The rear wall 57 of the water-resistant housing 49 is outwardly bowed as shown in FIG. 4 to urge the rear viewfinder lens element 55 firmly against the rear wall 21 of the outer pack 13, to position the rear viewfinder lens element to cover the rear opening 19 in the outer pack.

Figure 2:
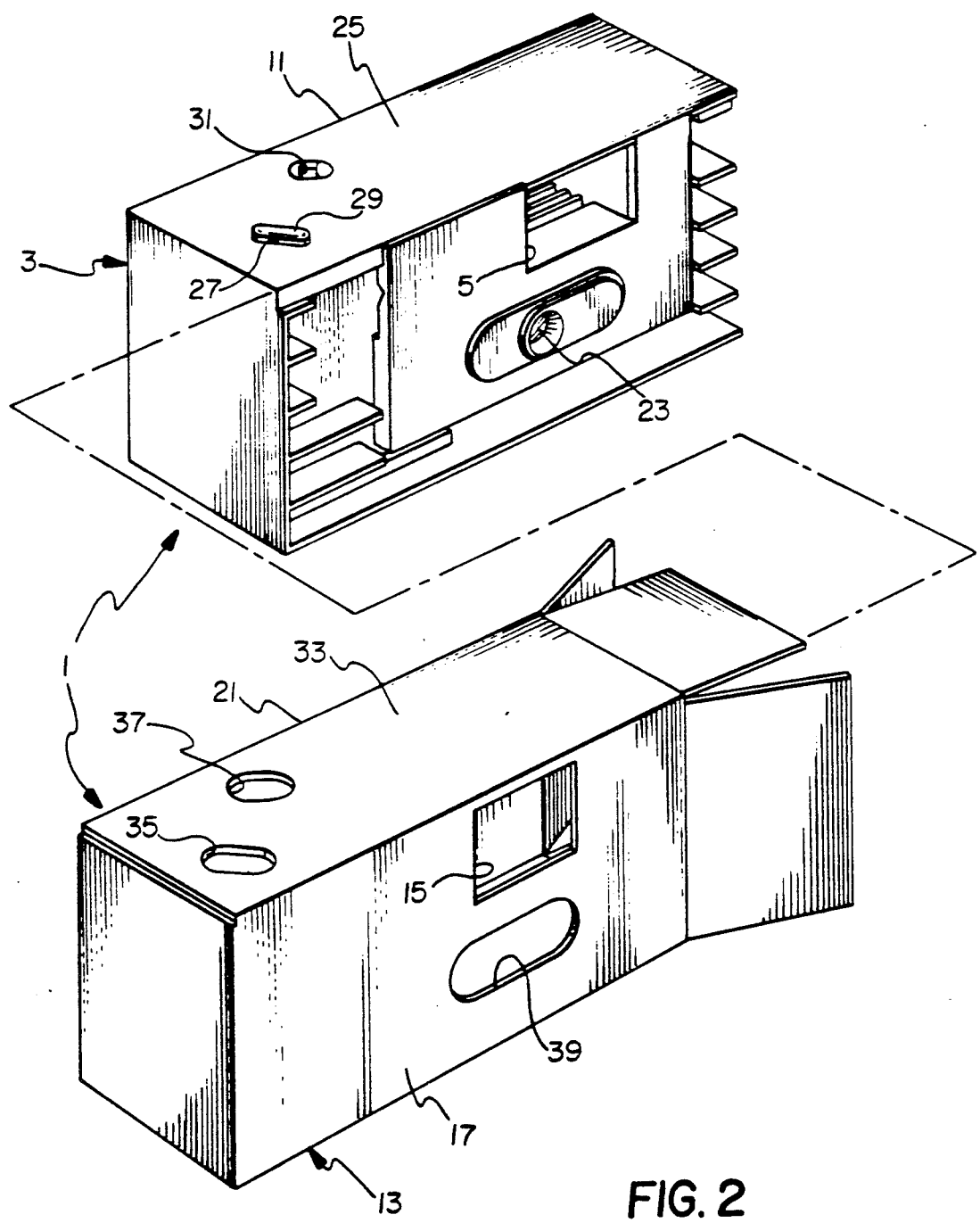
FIG. 2 is a front perspective view only of the underwater camera, showing a plastic inner camera shell and a paper outer sealed pack.

The water-resistant housing 49 may be injection molded in two pieces as shown in FIG. 2. The two pieces would then be sealed together in a watertight relation with the camera 1 enclosed between them. Since the front and rear viewfinder lens elements 51 and 55 may be made of the same material as the water-resistant housing, it is a simple matter to injection mold the lens elements with the casing.

A bottom opening 59 is provided in the water-resistant housing 49 to admit the stem 43 of the thumbwheel 41 into the respective bottom openings 45 and 47 in the outer sealed pack 13 and the inner camera shell 3. See FIG. 1. A flat rubber gasket 61 is sandwiched between the bottom opening 59 and the bottom opening 45 to prevent water from entering the housing 49 along the stem 43 of the thumbwheel 41.

Figure 5:
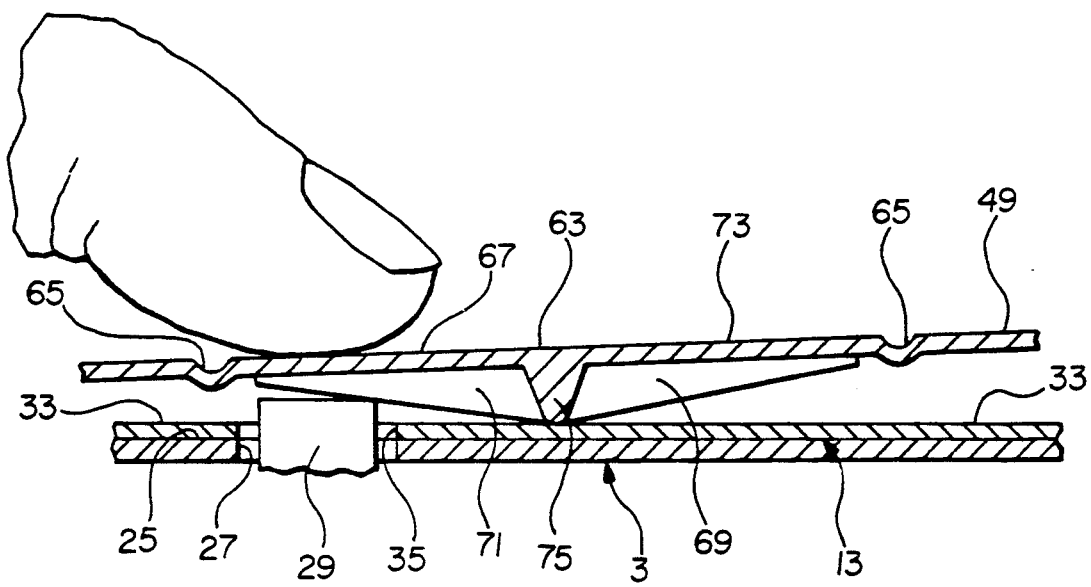
FIG. 5 is a sectional view of a pressure-compensation shutter release device located on the water-resistant housing.
Figure 6:
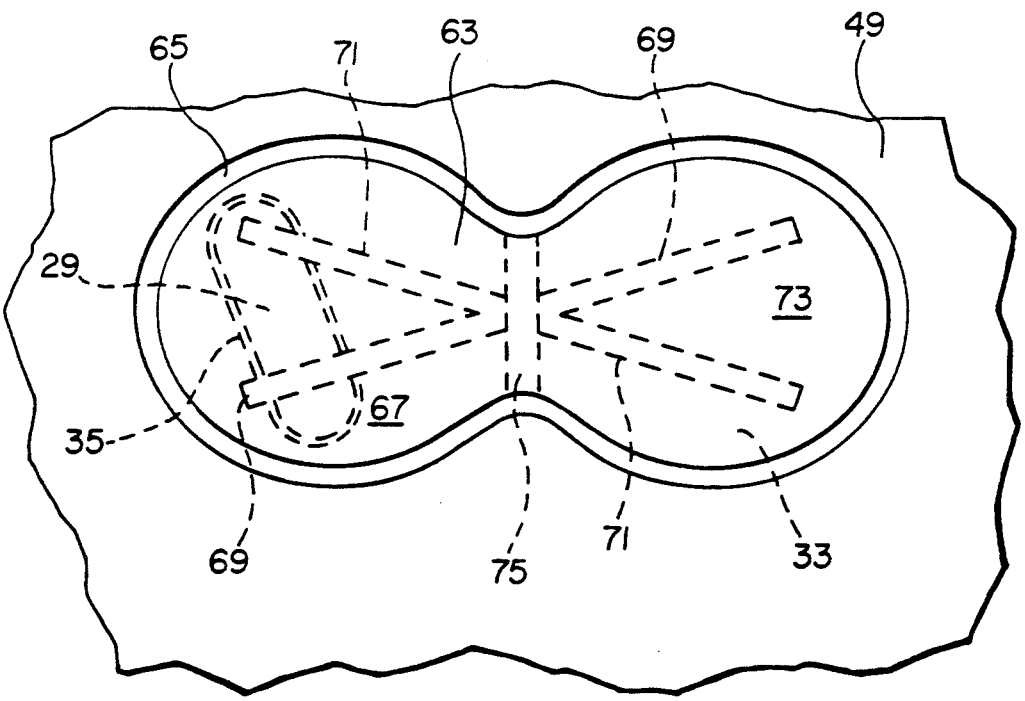
FIG 6 is a top plan view of the pressure-compensation shutter release device.

As shown in FIGS. 1, 5 and 6, the water-resistant housing 49 has a in wall-like portion 63 which is circumscribed by a flexure groove 65 in the housing. The flexure groove 65 allows the wall-like portion 63 to be manually depressed particularly at a region 67 of the wall-like portion opposite the shutter release button 29 to in turn depress the button. See FIG. 5. A pair of crossed stiffener ribs 69 and 71 integrally formed with the wall-like portion 63 are located beneath the wall-like portion in FIGS. 5 and 6. The stiffener ribs 69 and 71 extend over the region 67 of the wall-like portion 63 opposite the shutter release button 49, as well as over a region 73 of the wall-like portion remote from the button, for maintaining each one of the regions inflexible with respect to the other. A pivot rib 75 integrally formed with the wall-like portion 63 rests on the top wall 33 of the outer sealed pack 13. When the region 67 of the wall-like portion 63 is manually depressed to depress the shutter release button 29, it swings in a counter-clockwise direction in FIG. 5 about the pivot rib 65. Owing to the stiffener ribs 69 and 71, the region 73 of the wall-like portion 49 will swing in a similar direction about the pivot rib 65. Thus, with the camera 1 under water, the pivot rib 65 will cause the water pressure to balance the two regions 67 and 71 in order to prevent the water pressure from depressing the region 67 sufficiently to depress the shutter release button 29.

The invention has been described with reference to a preferred embodiment. However, it will be appreciated that variations and modifications can be effected with the ordinary skill in the art without departing from the scope of the invention.

I claim:

1. An improved camera for use under water, wherein a shutter release button located on a body of said camera is manually depressible and a water-resistant housing encloses said body, and wherein the improvement comprises:

seesaw means located on said housing which when depressed at a region of said seesaw means opposite said shutter release button is moved towards said body to depress the button and simultaneously at a region of the seesaw means remote from the button is moved away from the body, for causing the water pressure when said camera is placed under water to balance said regions in order to prevent the water pressure from depressing the region opposite the button sufficiently to depress the button.

2. The improvement as recited in claim 1, wherein said seesaw means is integrally formed with said housing.

3. An improved camera for use under water, wherein a shutter release button located on a body of said camera is manually depressible and a water-resistant housing encloses said body, and wherein the improvement comprises:

said housing has a wall-like portion and flexure means circumscribes said wall-like portion for allowing the wall-like portion to be depressed particularly at a region of the wall-like portion opposite said shutter release button to depress the button; and pivot means located between said body and said wall-like portion for causing the water pressure when said camera is placed under water to balance said region of the wall-like portion opposite said shutter release button and a region of the wall-like portion remote from the button in order to prevent the water pressure from depressing the region opposite the button sufficiently to depress the button.

4. An improved camera for use under water, wherein a shutter release button located on a body of said camera is manually depressible and a water-resistant housing encloses said body, and wherein the improvement comprises:

said housing has a wall-like portion and flexure means circumscribes said wall-like portion for allowing the wall-like portion to be depressed particularly at a region of the wall-like portion opposite said shutter release button to depress the button;

stiffener means fixed to said region of the wall-like portion opposite said shutter release button and a region of the wall-like portion remote from the button for maintaining each one of the regions inflexible with respect to the other; and pivot means located between said body, said region of the wall-like portion opposite said shutter release button and said region of the wall-like portion remote from the button for cooperation with said stiffener means for causing the water pressure when said camera is placed under water to balance the regions in order to prevent the water pressure from depressing the region opposite the button sufficiently to depress the button.

5. The improvement as recited in claim 4, wherein said pivot means is integrally formed with said wall-like portion and rests on said body.

6. The improvement as recited in claim 5, wherein said wall-like portion is relatively wide at said regions opposite said shutter release button and remote from the button and is relatively narrow adjacent said pivot means.

7. A water-resistant housing for a camera, comprising:

seesaw means located on said housing which when manually depressed at one region of said seesaw means moves inward of the housing and at another region of the seesaw means is adapted to move outward of the housing, for allowing the water pressure when the housing is placed under water to balance the two regions in order to prevent the water pressure from depressing said one region.

8. A water-resistant housing as recited in claim 7, wherein said seesaw means includes a wall-like portion of said housing which defines said two regions of the seesaw means, a flexure groove in the housing which circumscribes said wall-like portion, and pivot means fixed to said wall-like portion between the two regions.

* * * * *